TRANSISTOR TREE RING COUNTER

Filed April 22, 1959

4 Sheets-Sheet 1

INVENTOR
J. E. SCHWENKER
BY
S. E. Hollander
ATTORNEY

TRANSISTOR TREE RING COUNTER

Filed April 22, 1959 4 Sheets-Sheet 2

INVENTOR
J. E. SCHWENKER
BY S E Hollander
ATTORNEY

INVENTOR
J. E. SCHWENKER
BY S.E. Hollander
ATTORNEY

INVENTOR
J. E. SCHWENKER
BY S. E. Hollander
ATTORNEY

United States Patent Office 3,035,185

Patented May 15, 1962

3,035,185

TRANSISTOR TREE RING COUNTER

John E. Schwenker, Millington, N.J., assignor to Bell Telephone Laboratories, Incorporated, New York, N.Y., a corporation of New York Filed Apr. 22, 1959, Ser. No. 808,053
26 Claims. (Cl. 307—88.5)

This invention relates to a ring counter and in particular to a ring counter using a transistor tree configuration.

Numerous applications in computer technology, telephone switching techniques and data processing devices require a stepping switch or ring counter to drive or gate different circuits in time sequence. A characteristic of such switches is that a particular terminal of the switch may be distinguished from the remaining terminals at any instant of time by having a different voltage applied to it or alternatively by the presence of a pulse and a concomitant lack of pulses on other terminals.

Functionally these switches may be divided into two elements, one encompassing the terminals and associated circuitry and the other the control means. In the well-known mechanical rotary stepping switch utilized, for example, in step-by-step telephone switching systems, the control means includes a ratchet arrangement for advancing the wiper arm coupled with the memory of the existing state which corresponds to the mechanical position of the arm.

The same functions and attributes must be present in a corresponding electrical circuit, i.e., memory or knowledge of a particular state and means for advancing to the next desired state.

In some prior art electrical circuits of this genre, a form of counter arranged to recycle when a particular count is attained and an arrangement of logic gates to decode the output of the counter into a one-out-of-*n* form are employed.

Alternatively a type of shift register in which all stages but one are in the "0" or unactivated state is utilized. The shift register arrangement generally requires no decoding capabilities but does necessitate a full stage per output plus steering circuitry between stages.

The principal hazard in both types of circuits is that more than one stage may be activated resulting in an ambiguity of output function and a generally invalid result.

Thus, although completely operative and useful, prior counters and shift registers are vulnerable to inaccuracies occasioned by erroneous multiple outputs.

It is therefore an object of this invention to provide a transistor stepping switch and ring counter in which no more than one output can be activated at any time.

A further object of this invention is to provide a transistor counter utilizing a novel tree configuration.

It is still another object of this invention to provide a transistor tree ring counter in which a control signal applied to the apex of the tree is self-propagated through each of the stages of the tree.

It is still another object of this invention to provide a tree ring counter adaptable to recycle at varying counts.

It is another object of this invention to provide a counter which can be set to any desired state.

It is a further object of this invention to provide a counter capable of starting from any predetermined position.

It is still another object of this invention to provide a counter which automatically proceeds from a given output state to another predetermined output state.

These and other objects of the invention are realized in an illustrative embodiment in which a configuration similar to a conventional relay tree is employed. A number of stages are tandemly connected with the output of a particular stage serving as the input to a succeeding stage. In an illustrative embodiment the initial stage consists of a transistor flip-flop the collectors of which feed the emitters of a second stage including two transistor flip-flops that in turn controls a third stage comprising four transistor flip-flops. The output of the third stage includes eight output conductors only one of which is energized at a particular time.

A significant departure from existing "tree" arrangements utilizing transistor flip-flops is rooted in the feedback connections between the flip-flop elements.

The feedback paths for each transistor flip-flop include direct-current paths and alternating-current paths. The direct-current feedback paths are conventionally connected but the alternating-current feedback paths (in lieu of a routine parallel connection with the direct-current paths) are wholly divorced from the direct-current paths in order to transfer signals between stages in a cyclical fashion. The order in which the transistors and output conductors in the third stage are energized is determined by the manner of interconnection of the alternating-current feedback paths.

To operate the counter, the state of the flip-flop in the first stage is changed. The collector outputs of the first stage flip-flop vary in accordance with the change and the transistors in the second stage are shifted in energization. As a result of the intra-stage alternating-current feedback paths and the inter-stage collector-emitter connections a single transistor in the third stage is driven into the conducting condition and the collector thereof energizes a particular output conductor.

Thus, implicit in the above-described operation is another significant innovation in the structure of tree circuits. In lieu of applying control signals to each level of the tree as in preexisting facilities, a single control impulse at the input to the tree is effective by self-propagation through each of the stages of the tree to energize a particular output conductor.

Further changes in the state of the first stage flip-flop initiate signals which propagate through the tree in a similar manner and the output terminals of the third stage are energized in the desired sequence in accordance with the intra and inter-stage connections.

Unusually high reliability in assuring that one and only one output conductor is energized at a particular time is incorporated in the utilization of the modified tree configuration. It is manifest from an examination of the tree that only one transistor in each level can be operated at any one time since the remainder are positively cut off. The disjunctive qualities that inhere in the use of a tree circuit contribute to the virtually error-free operation obtained.

A feature of this invention is a transistor tree arrangement utilizing transistor flip-flops.

Another feature of this invention is a transistor tree configuration utilizing transistor flip-flops in which the direct-current and alternating-current feedback paths have been split.

It is still another feature of this invention that the alternating-current feedback paths are adapted to function as control circuitry.

Still another feature of this invention is a tree ring counter adapted to recycle at a predetermined count.

Another feature of this invention is a ring counter adapted to proceed from a particular output state to another arbitrary output state.

Still another feature of this invention is a variable length ring counter.

These and other objects and features of the invention may be more fully appreciated from an examination of the following specification and attached drawing, in which.

DETAILED DESCRIPTION

*Transistor Tree Ring Counter*

Figures 1, 3:
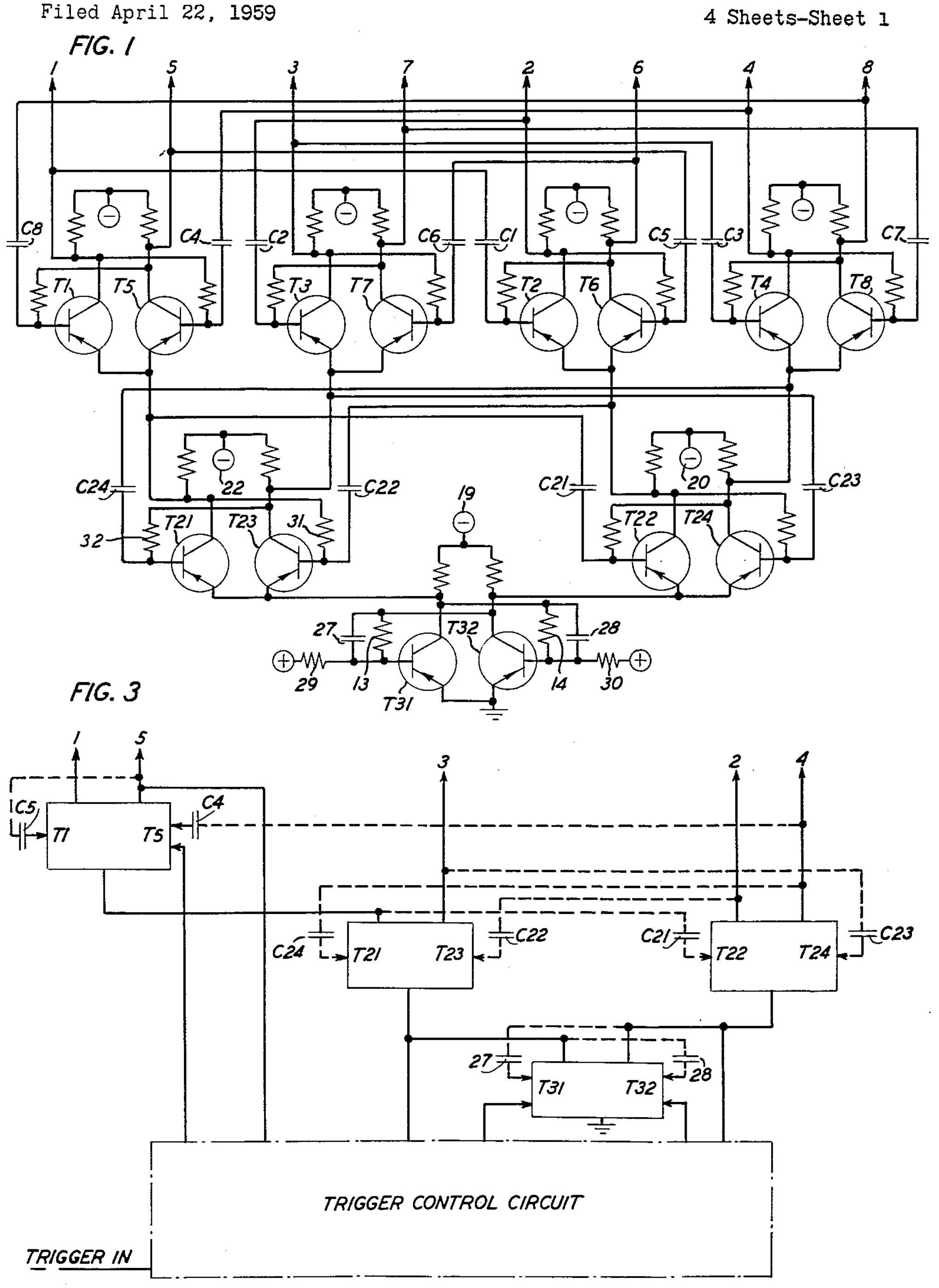
FIG. 1 is an embodiment of the invention incorporating three stages of flip-flop circuitry.
FIG. 3 is a block diagram of an arrangement for recycling at the count of five.

Referring to FIG. 1 an embodiment of the invention is shown in which three stages of flip-flops are illustrated. Examining transistors T31 and T32 specifically, it is seen that there are two separate feedback paths for the two transistors. A direct-current path exists from the collector of transistor T32 to the base of transistor T31 over resistance 13 and a corresponding path exists between the collector of transistor T31 and the base of transistor T32 over resistance 14.

Alternating-current paths may be similarly traced through the parallel coupling capacitors 27 and 28 which are used to accelerate a change from one state to another. It will be noted that in FIG. 1 the conventional base bias resistors 29 and 30 and their associated voltage sources have been omitted for purposes of clarity from all but transistors T31 and T32.

Although transistors T31 and T32 have alternating-current and direct-current feedback paths which duplicate each other, the higher level transistors T21–T24 and T1–T8 have split direct-current and alternating-current feedback paths. As an illustration, the direct-current feedback path between transistors T21 and T23 extends from the collector of transistor T21 to the base of transistor T23 over resistance 31. A similar path extends from the collector of transistor T23 to the base of transistor T21 over resistance 32. Examining the alternating-current feedback paths from transistors T21 and T23, it is seen that the collector of transistor T21 is connected via capacitor C21 to the base of transistor T22 and the collector of transistor T23 is connected over capacitor C23 to the base of transistor T24. Moreover, the collector of transistor T22 is connected to the base of transistor T23 over capacitor C22 and the collector of transistor T24 is connected to the base of transistor T21 over capacitor C24. It is manifest from this observation that the alternating-current and direct-current feedback paths in the second level are wholly disparate. A similar analysis can be made in the third level including transistors T1–T8.

The over-all interconnections of the alternating-current feedback paths have been expressly divorced from the direct-current feedback paths in order to energize the transistors in each level in a cyclical order. The numerical order in which transistors T1–T8 are energized is indicated by output conductors 1–8 which respectively extend from the collector electrodes of transistors T1–T8.

In analyzing the operation of the circuitry of FIG. 1 it may be assumed that transistors T1, T21 and T31 are initially in the conducting condition. Under these circumstances output conductor 1 will be grounded over a path which may be traced from ground at the emitters of transistors T31 and T32 through the emitter-collector paths of transmitters T31, T21 and T1.

In consequence of the bistable nature of the tree all of the other outputs are negative. For example, the negative voltage from source 19 which appears at the collector electrode of transistor T32 back biases transistors T22 and T24. Similarly the negative potential from source 20 applied to the collector electrodes of nonconducting transistors T22 and T24 biases transistors T2, T6, T4 and T8 nonconducting.

Transistor T23 is biased in the off condition in consequence of the lack of drive current from the collector of transistor T21 over resistance 31 and consequently transistors T3 and T7 are biased in the nonconducting condition.

It will now be assumed that the state of transistors T31 and T32 is interchanged by a pulse applied to the base of transistor T31 by a pulsing source, not shown.

The collector of transistor T21 which previously approximated ground potential is now driven to a negative potential approaching that of source 22. At the same time the emitter of transistor T22 which was at a potential approximating that of source 19 is now driven in a positive direction toward ground at the collector of transistor T32. In consequence a total change in voltage of about 2V (where V is the magnitude of the negative supply voltage) develops across capacitor C21 and the base-emitter junction of transistor T22, and the resulting current flow causes transistor T22 to conduct. Transistor T22 is maintained conducting by the direct-current feedback from the collector of transistor T24. The change in voltage across capacitor C23 and the base-emitter junction of transistor T24 at this time is approximately V since the emitter of transistor T24 is driven from a negative potential approaching that of source 19 to ground potential at the collector of transistor T32 but the other side of capacitor C23 which is connected to the collector electrode of transistor T23, previously nonconducting, experiences virtually no voltage change.

In consequence, the ratio of the signal applied to the selected transistor to that supplied to the unselected transistor is about 2 to 1.

The change in voltage across capacitors C24 and C22 at this time is in a direction to turn transistors T21 and T23 off. For example, capacitor C24 which is connected to the collector electrode of transistor T24 is subject to a voltage excursion of approximately V in consequence of the change in potential at the emitter of transistor T21 from ground potential to a negative potential from source 19, and capacitor C22 experiences a voltage excursion from a negative potential approaching that of source 20 to ground at the collector electrode of transistor T22.

The change in state of the tree has thus far been traced through conducting transistors T32 and T22. Changes in the upper level of transistors occur in a similar manner. Thus the ground condition at the collector electrode of transistor T22 and the negative condition at the collector electrode of transistor T1 produce a voltage of approximately 2V applied to capacitor C1 which causes transistor T2 to conduct. The change in voltage applied to capacitor C5 at this time is equal approximately to V. The changes applied to capacitors C3 and C7 at this time are practically nil. The changes applied to capacitors C2 and C8 are in a direction to turn the corresponding transistors off and the changes in voltage across capacitors C4 and C6 are approximately zero. Thus in consequence of the change in state of the bottom flip-flop from transistor T31 to transistor T32 and in consequence of the previous output at conductor 1 a new output now appears as a ground condition at conductor 2 which extends from the collector electrode of transistor T2.

It may be demonstrated that further changes in the state of the bottom flip-flop initiate signals which propagate through the tree in a similar manner grounding output conductors 3–8 in the numbered sequence. It is interesting to observe that in the above description the assumed control signals were applied only to the bottom flip-flop or lowest level of the tree and subsequent changes in the higher levels of the tree were induced by upward self-propagation.

*Steering Circuitry for Tree Ring Counter*

Figure 2:
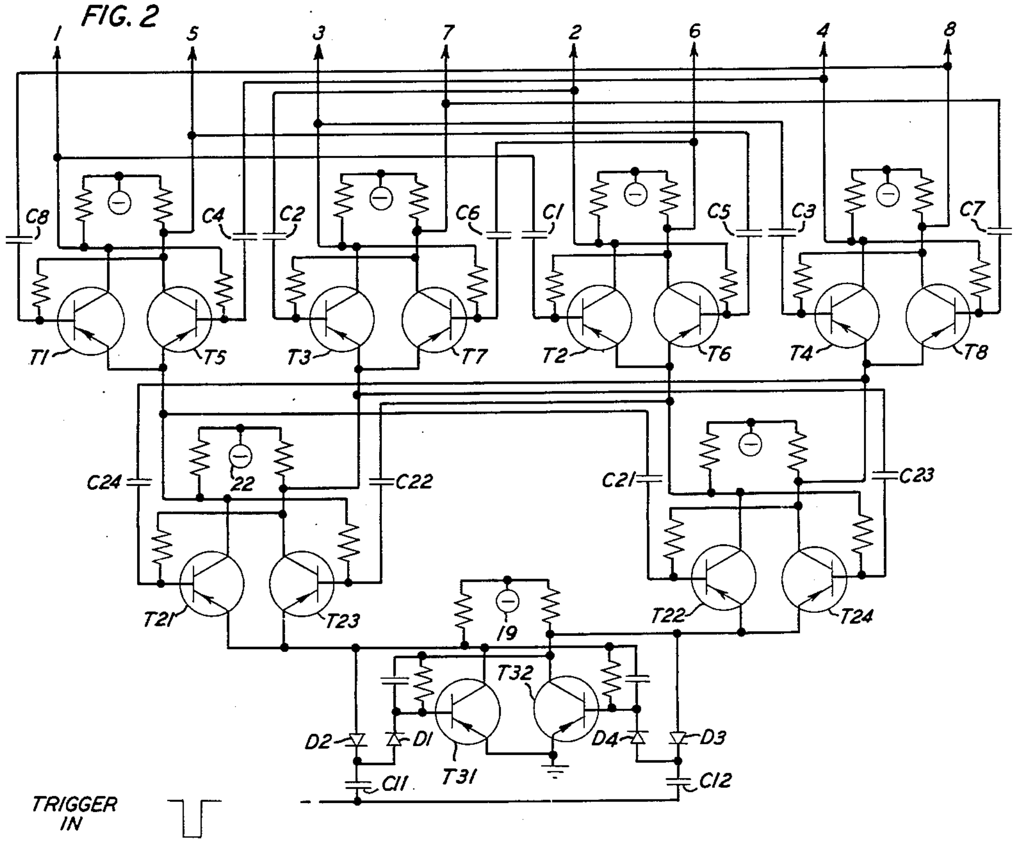
FIG. 2 is an embodiment of the invention similar to that of FIG. 1 including steering circuitry utilized to trigger the bottom flip-flop.

FIG. 2 shows a tree ring counter similar to that of FIG. 1 and includes in addition the control circuitry utilized to steer transistors T31 and T32. This type of control circuitry has been adapted to enhance the reliability of circuit operation. The negative trigger pulse shown in graphic form is limited in magnitude to a value which is less than the maximum collector voltage. If transistor T31 is assumed to be initially conducting a trigger pulse of the form shown in FIG. 2 causes diode D2 to conduct whereas diode D3 which is back biased by the collector voltage from source 19 does not conduct. Thus, during the continuance of the pulse, energy is stored in capacitor C11 but no energy is stored in capacitor C12. When the pulse terminates, the stored energy in capacitor C11 is discharged into the base circuit of transistor T31 over diode D1 in a direction to turn that transistor off.

In consequence, the transistor T32 is now conducting and transistor T31 is cut off. On the advent of the next trigger pulse, energy is stored in capacitor C12 since diode D3 will now conduct whereas diode D2 will be back biased. When the second pulse terminates the energy stored in capacitor C12 is delivered through diode D4 to the base circuit of transistor T32 to cut off that transistor. Additional input pulses result in similar reactions and cause transistors T31 and T32 to shift conduction alternately.

It may be observed from the operation and structure of the control circuitry of FIG. 2 that the reliability of the steering circuit is independent of the reaction time of the individual components in the circuit. Instead the requirements for the trigger pulse are merely that it be less than a given amplitude (collector voltage) wider than a particular width and have less than a given maximum fall time.

The circuit of FIGS. 1 and 2 recycles at the count of eight. If, however, the tree is permitted to grow by adding a fourth stage of sixteen transistors connected to the third stage in a manner similar to the connections between the second and third stages, the tree will recycle at a count of sixteen. Still further stages added to the tree will result in trees which recycle at counts of higher integral powers of two.

In some applications, however, it is of value to adapt the circuit to recycle and count numbers which are not integral powers of two. Illustrations will be given for counting five and six.

*"5" Count Recycle*

Referring now to FIG. 3 an arrangement for recycling at the count of five is shown. The dotted lines between the blocks represent alternating-current feedback paths and the arrows indicate connections to the base electrodes. The essential modification in FIG. 3 is that two feedback capacitors are connected to the output conductor 4. One of these capacitors C4 extends from output conductor 4 to the base electrode of transistor T5. The other capacitor extends from output conductor 4 to the base electrode of capacitor T21. It will be observed that the split in alternating-current feedback paths is required as a result of the incomplete third level.

It is understood in analyzing FIG. 3 that the box designated T31 and T32 includes the apparatus described in detail for transistors T31 and T32 of FIGS. 1 and 2. Similarly the other boxes refer to the corresponding transistors and ancillary apparatus shown in detail in FIGS. 1 and 2. The trigger control shown in outline form in FIG. 3 is essential to change the location to which the trigger input pulse is applied during the counter operating cycle. The circuitry of the trigger control is shown in detail in FIG. 4 and will be described herein.

Reference to FIG. 3 and an appreciation of the operation of the tree circuit as described for FIGS. 1 and 2 indicates that if the initial condition of the tree provides for transistors T1, T21 and T31 to be conducting, an output or ground condition is manifested at output conductor 1. A subsequent input pulse to shift the conduction from transistor T31 to transistor T32 will result in the energization of transistor T22 and output conductor 2. The manner in which transistor T22 is energized and the application of a voltage of 2V to capacitor C21 was explained in detail for FIGS. 1 and 2.

When the bottom flip-flop again changes state and transistor T31 conducts a voltage of 2V is applied to capacitor C22 through the feedback connection between transistors T22 and T23 causing transistor T23 to conduct and providing an output indication at output conductor 3. Similarly the next pulse to the bottom flip-flop causes transistor 124 to conduct through feedback over capacitor C23 thereby producing an output indication at output conductor 4.

At this time transistors T32 and T24 are conducting. When the bottom flip-flop changes state and transistor T31 conducts, the double feedback connection from output conductor 4 to transistors T21 and T5 is energized. Under these circumstances a voltage of 2V will appear across capacitors C24 and C4 energizing respectively transistors T21 and T5. The No. 5 output conductor is grounded as a result of the energization of transistor T5.

When the next pulse is received it is essential to prevent the bottom flip-flop and the flip-flops in the second level from changing state in order to permit recycling to the count of one. The only flip-flop which should change state is the flip-flop including transistors T1 and T5. Thus it is necessary to provide the input pulse which appears when output conductor 5 is grounded directly to the flip-flop in which a change of state is desired, i.e., the flip-flop including transistors T1 and T5.

Figure 4:
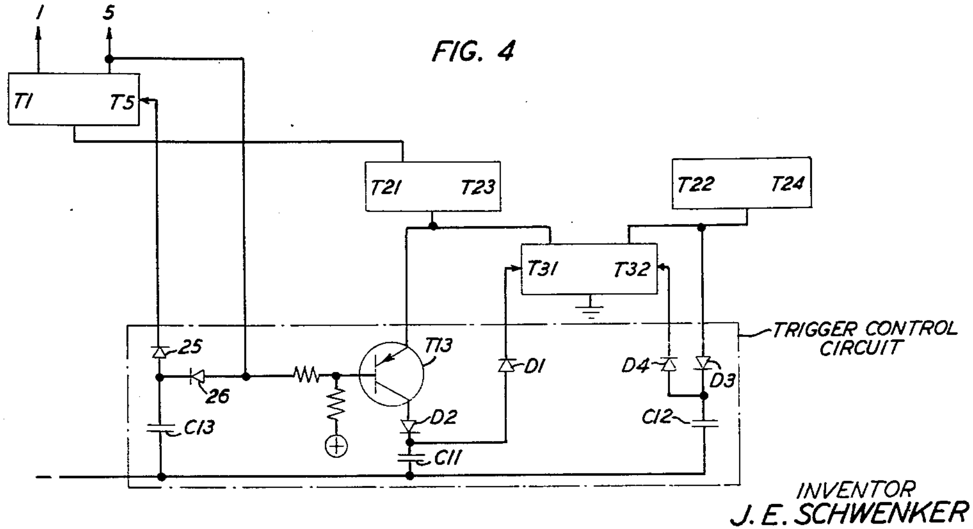
FIG. 4 is an embodiment of the invention similar to that of FIG. 3 and incorporating control circuitry for varying the position at which the input trigger is applied.

The circuitry necessary to accomplish this expedient is shown in detail in FIG. 4. The structure of FIG. 4 is similar to that of FIG. 3 insofar as the tree circuit is concerned and the alternating-current feedback paths and capacitors of FIG. 3 have been omitted from FIG. 4 to facilitate the explanation of the trigger control circuit.

Referring specifically to FIG. 4 it is seen that transistor T13 is saturated whenever transistor T31 is saturated and transistor T5 is not saturated, i.e., when output 1 or 3 is grounded. This follows since when transistor T31 is saturated, or conducting, the collector potential thereof is approximately ground potential and this potential appears at the emitter of transistor T13. Transistor T13 is thus forward biased at the emitter with respect to the base thereof. If, however, transistor T31 is not conducting a negative potential appears at the collector electrode of transistor T31 and back biases transistor T13.

If transistor T31 is conducting but transistor T5 is also conducting the ground potentials appearing at the emitter and base of transistor T13 will prevent energization of that transistor. Referring back to FIG. 3 it is seen that transistor T13 will be saturated when outputs are available at output conductors 1 and 3 since outputs at conductors 1 and 3 occur when transistor T31 is conducting and transistor T5 is not conducting. In either of these two instances the next succeeding trigger pulse will change the state of the bottom flip-flop in the usual manner by storing energy in capacitor C11 and then using that energy to turn off transistor T31 as described in the operation of FIG. 2. This follows since transistor T13 when saturated inserts a low impedance in the capacitor C11 charge path.

When output conductor 5 is grounded, however, transistor T13 is not saturated as explained above and the trigger pulse cannot store energy in capacitor C11 in view of the serial interruption of the charge path. In consequence when the trigger pulse terminates the bottom flip-flop does not change state. Under these circumstances the capacitor C13 charges over diode 26 to ground at the output conductor 5 during the course of the input pulse. When the pulse terminates, the energy stored in capacitor C13 is delivered through diode 25 to the base electrode of transistor T5 thereby turning off that transistor and in consequence turning on transistor T1. The manner in which the energy stored in capacitor C13 operates to cut off transistor T5 is similar to the arrangement including capacitors C11 and C12 described above. Thus output conductor 1 of FIGS. 3 and 4 is energized in consequence of a pulse which arrives when output conductor 5 is grounded thereby completing the recycling of the "5" counter. Subsequent pulses applied to the counter operate thereon in a manner similar to that described above.

It has been found that the trigger control circuit of FIG. 4 is not always required to process all counts other than powers of two. For example, the circuit of FIG. 5 which is a "6" counter has been arranged to operate without the trigger control.

*Transistor Tree Ring "6" Counter*

Figure 5:
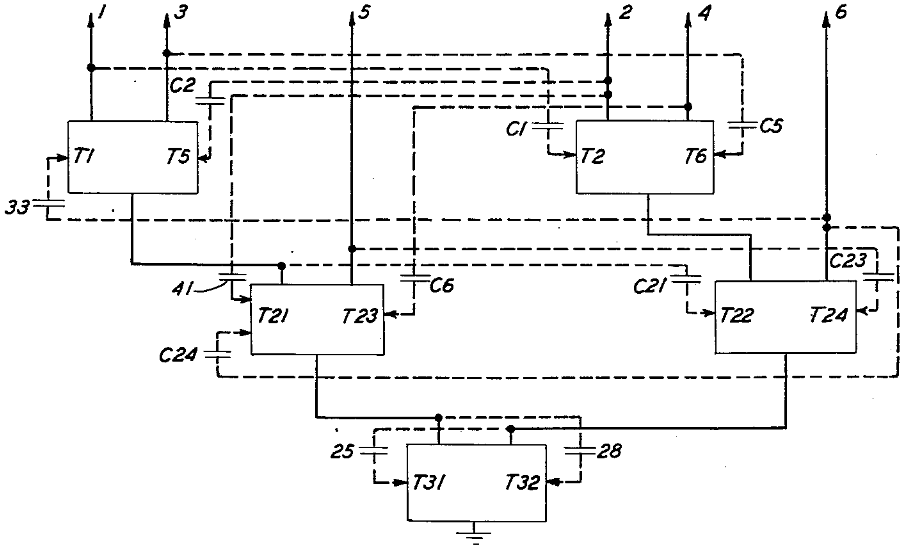
FIG. 5 illustrates an arrangement for counting up to six.

FIG. 5 shows in block diagram form arrangements for recycling at the count of six. Again it is apparent that multiple alternating-current feedback paths are required in certain instances in consequence of the incomplete third level of the switch. Thus at output conductors 2 and 6 two separate alternating-current feedback paths exist. In this case two inputs are supplied to the base electrode of transistor T21 the first extending from output conductor 2 over capacitor 41 and the second extending from output conductor 6 over capacitor C24. Again it will be assumed that transistors T1, T21 and T31 are initially conducting. Also it will be assumed that the boxes shown include all of the circuit apparatus ancillary to the numbered transistors as shown in FIGS. 1 and 2.

When a pulse arrives and shifts the state of the bottom flip-flop, transistor T32 conducts and transistor T31 is cut off. Transistor T22 in the second level conducts in consequence of the 2V voltage which is applied to capacitor C21 and transistor T2 conducts in consequence of the 2V voltage which is applied to capacitor C1. Output conductor 2 is thereby grounded.

In a similar manner the third pulse causes transistors T31, T21 and T5 to conduct thereby grounding output conductor 3.

The fourth pulse again shifts conduction back to transistors T32, T22 and T6 thereby grounding output conductor 4. Through feedback connections from transistor T6 to the base electrode of transistor T23 the fifth pulse energizes transistor T23 placing a ground on output conductor 5.

Similarly in consequence of the feedback path over capacitor C23 to the base electrode of transistor T24 the sixth input pulse grounds conductor 6.

The next input pulse to arrive produces 2V voltages applied to capacitor C24 extending to transistor T21 and capacitor 33 extending to transistor T1 which reintroduces the original circuit condition by causing transistors T1, T21 and T31 to conduct. Subsequent pulses will produce a similar sequential operation.

In analyzing the operation of the "6" counter of FIG. 5 it will be seen that a distinguishing characteristic is that a change in location of the ground path to the output conductors occurs in each level of the tree for each input pulse. In consequence of this arrangement it is possible to connect the split feedback capacitors to provide the desired sequence. It has been found that similar arrangements work for other even numbers.

The circuits considered thus far may be considered to be *n*-stable since they are stable in any of the *n* output states. It may be advantageous in certain applications to adapt the tree ring counter to proceed from a particular output state to any other arbitrary output state directly. The modification required to permit the circuit to proceed to any arbitrary output state directly is shown in FIG. 6.

*Tree Ring Counter Assumes Desired Arbitrary Output State*

Figure 6:
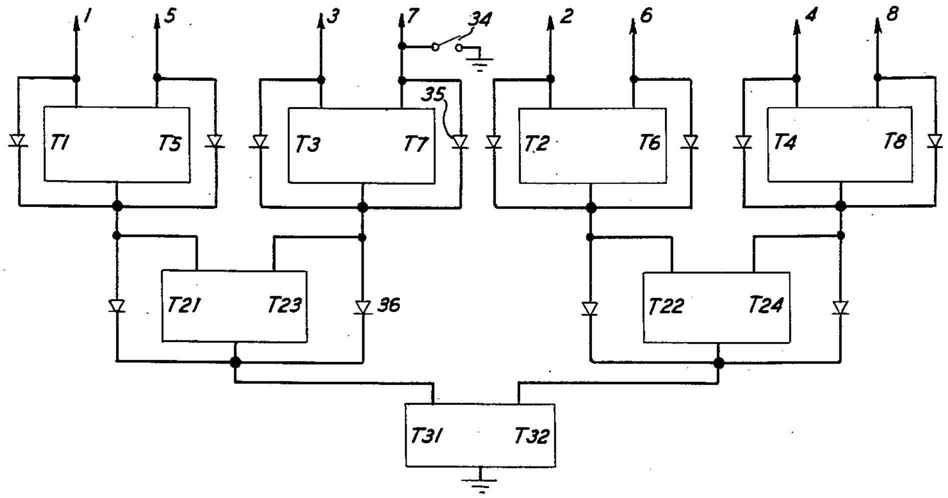
FIG. 6 shows a modification of the circuit of FIG. 1 in which the counter is adapted to proceed from a given output state to an arbitrary desired output state.

The block diagram shown in FIG. 6 is intended to include the circuitry of FIG. 2 in its entirety although only the connections between ascending stages and certain diodes useful in producing the desired output state are shown.

It will be assumed that transistors T1, T21 and T31 of FIG. 6 are conducting and that it is desired to transfer the state of the tree to the output at conductor 7. It will be noted that diodes have been connected in parallel with the collector-emitter paths of all transistors in the tree except those in the bottom level.

To produce the desired No. 7 output state it is only necessary to ground output conductor 7 momentarily as shown symbolically by operating switch 34. The ground applied at the collector electrode of transistor T7 causes diode 35 to apply a ground potential to the emitters of transistors T3 and T7 and to the collector of transistor T23 and similarly diode 36 applies a ground potential to the emitters of transistors T21 and T23 and also to the collector of transistor T31. The presence of ground potential as these points in the tree forces the direct-current feedback paths to supply drive current to transistors T31, T23 and T7 and to none of the others. Thus the direct-current feedback paths shown in FIG. 2 force the tree to assume the new state and hold the tree in that state when the initiating ground is removed.

The tree, nevertheless, retains its ability to operate as a stepping switch counter and may thus be used in the form shown in FIG. 6 as a switch capable of starting from any predetermined position. If a lesser number of states may be required to be used as starting states a proportionate number of the diodes may be eliminated. The only diodes necessary to be able to select a given output are those which are needed to form a path from that output down through the tree to the bottom level flip-flop.

By shunting each of the emitter-collector paths with a diode and by introducing a ground condition at the output conductor, the diodes are poled in a direction to establish a ground potential at each of the emitters and collectors in the desired path. It is apparent from what has been discussed above in relation to the operation of the transistor tree counter that the direct-current feedback paths will drive the tree into the state which is forced on the tree by grounding the desired collector-emitter electrodes and will hold the tree in that state even when the initiating ground is removed.

It is further apparent from what has been discussed above that the disjunctive qualities of the tree will prevent any other transistor than the selected transistor, in each level, from operating.

When subsequent pulses are applied to the input of the tree as shown in FIG. 2, the tree will count in the manner described above, i.e., the next output when a pulse arrives will be manifested at output conductor 8. It may be noted that the configuration of FIG. 6 provides two directions of self-propagation; the first being the automatic propagation of control impulses upward through the tree from the bottom level to the top level as explained in the operation of FIGS. 1 and 2. The second direction of propagation is now opposed to the first and begins at the uppermost level of the tree and propagates in a downward direction through the diodes or transistors which are conducting to the lowest level.

It is also interesting to observe that the selected state may be arbitrarily imposed on the tree even in those instances where transistors in the desired conducting path are already in the saturated condition. Under the latter circumstances the initiating ground will merely traverse the conducting transistor in lieu of passing through the diode shunting the transistor in view of the relatively lower parallel impedance of the saturated transistor.

Heretofore the transistor tree ring counter has been considered as a counter which will recycle at a predetermined count or one in which the tree may be forced to assume an arbitrary state, and thereafter recycle beginning at that state after a predetermined count. However, the flexibility of operation that inheres in the tree ring counter may also be exploited to advantage by adapting the basic circuitry to perform a count of variable length.

*A Variable Length Transistor Tree Ring Counter*

Figure 7:
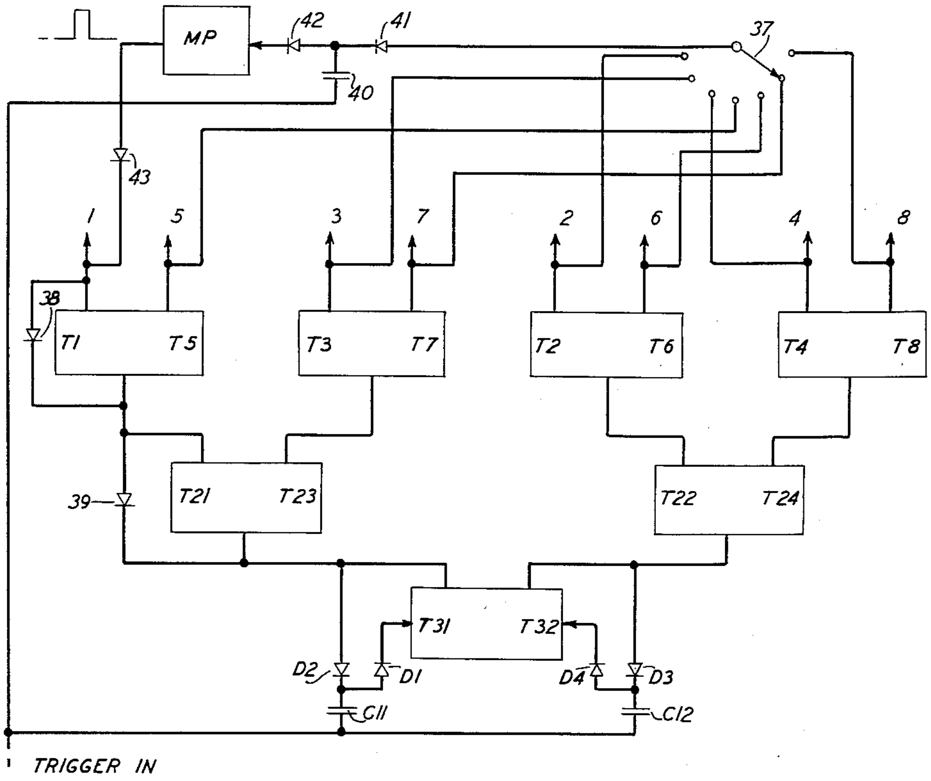
FIG. 7 illustrates an embodiment of the invention including a variable length ring counter.

Referring now to FIG. 7 it will be seen that a monopulser PM and additional apparatus have been incorporated in the basic circuitry to adapt the configuration to perform a count of desired variable length. In FIG. 7 the boxes again represent the designated transistors and associated circuitry shown in detail in FIG. 2, for example. For the position of switch 37 which is illustrated, the counter will recycle after the count of seven. As will be explained herein switch 37 may be altered in position to permit recycling after other counts. For example, if switch 37 is adjusted to connect to output conductor 4 the counter will recycle after a count of four.

It will be observed that shunting diodes 38 and 39 similar to those used in FIG. 6 are incorporated in shunt with transistors T1 and T21.

For purposes of explanation it will be assumed that the counter has counted seven pulses in the manner described heretofore. On the arrival of the eighth pulse, capacitor C11 and capacitor 40 charge during the interval of continuance of the input pulse. Capacitor C11 charges in the manner described for the operation of FIG. 2 and capacitor 40 charges over a path including ground at the output terminal of conductor 7, switch 37 and diode 41.

When the eighth input pulse subsides, capacitor C11 discharges through diode D1 into the base circuit of transistor T31 to disenable that transistor and capacitor 40 discharges through diode 42 to trigger the monopulser which momentarily grounds output conductor 1.

In consequence of the imposition of ground potential at the collectors and emitters of transistors T1, and T21, the tree is forced to assume the state represented thereby and in accordance with the explanation made for the operation of the circuitry of FIG. 6 the ground at output conductor 1 and the direct-current feedback paths force the tree to maintain that state. Thus transistors T1, T21 and T31 are forced into conduction at the termination of the eighth pulse.

When the next pulse arrives, capacitor C11 again charges but capacitor 40 cannot charge in view of the interruption of its charge path at diode 41 which is now back biased since no ground condition obtains at the output conductor 7. When the pulse terminates, the energy stored in capacitor C11 is discharged into the base of transistor T31 as explained above and the tree shifts conduction to transistors T32, T22 and T2 producing an output ground at output conductor 2.

Subsequent pulses effect changes in state in the manner described above until the eighth input pulse is received when the tree again shifts conduction to output conductor 1. The monopulser shown in box form may take any suitable form and is well known in the art. For example, a pulser of the type shown in "Transistor Circuit Engineering" by R. F. Shea, 1957, page 347, may be used if modifications are made to provide an output pulse at ground potential.

It is understood that although flip-flops or binary devices have been shown, the tree ring counter may be developed from elements of a ternary nature. For example, the first stage may include an element having three states, each of which is manifested on a separate output conductor. The second stage may correspondingly include three ternary elements, each supplied by a first stage output conductor. Further growth of the tree may proceed in an analogous manner with nine ternary elements in the third stage, etc.

As a further variation some stages may include binary elements and others ternary elements, quaternary elements, etc.

Moreover it will be observed that in the embodiments shown the individual transistors need not be and in fact are not inherently binary elements but merely devices driven between two extreme operating conditions.

It is further understood that the above embodiments are merely exemplary and that various modifications may be made by those skilled in the art without departing from the spirit and scope of the invention.

What is claimed is:

1. A tree ring counter comprising a plurality of bistable devices operable to assume either of two states and having alternating-current and direct-current feedback paths, means for connecting said devices in serially related stages, means for applying control signals to an initial one of said stages, means responsive to the receipt of said control signals by said initial stage for selectively rendering said devices in a succeeding one of said stages operable and inoperable, means for connecting the alternating-current feedback paths of said bistable devices in said succeeding stage to selected other of said bistable devices in accordance with a code, means for individually connecting said direct-current feedback paths within each of said bistable devices, and a plurality of output conductors connected to a terminal one of said stages and adapted to be energized in a sequence determined by said code in response to the application of said control signal to said initial stage.

2. A tree ring counter in accordance with claim 1 wherein said means for applying control signals to an initial one of said stages comprises capacitor means, a pair of oppositely poled unilaterally conducting devices, means for connecting said unilaterally conducting devices in shunt and means for connecting said unilaterally conducting devices to said capacitor means, said capacitor being responsive during the continuance of an input pulse to store energy therein over a path including one of said unilaterally conducing devices, said capacitor being responsive to the termination of said pulse to discharge into said initial stage over a path including the other of said unilaterally conducting devices thereby to alter the state of said stage.

3. A transistor tree ring counter in accordance with claim 1 wherein said bistable devices comprise a pair of transistors, wherein said direct-current feedback means are arranged to connect said pair in flip-flop configuration, wherein said responsive means includes said means for connecting said devices in serially related diverging stages and wherein said latter means includes means for applying the potentials appearing at the collector electrodes of the transistors of preceding stages to the emitter electrodes of the transistors of succeeding stages.

4. In a transistor tree ring counter, input control means comprising a source of pulses, a bistable utilization circuit, said control means operable substantially independent of the reaction time of said utilization circuit, a capacitor, first and second oppositely poled semiconductor diodes, means for connecting said diodes in shunt and means for connecting said diodes to said capacitor, means for connecting a first of said diodes to a source of reference potential, and means for connecting a second of said diodes to said utilization circuit, said capacitor being responsive during a current pulse from said pulsing source to store energy therein over a path including said first diode, said second diode being poled in a direction to prevent the passage of said current pulse therethrough and through said utilization circuit, said capacitor being further responsive to the termination of said pulse to discharge into said utilization circuit over a path including said second diode to alter the state of said utilization circuit.

5. A transistor tree ring counter comprising a plurality of bistable devices having alternating-current and direct-current feedback paths, means for connecting said devices in serially related stages, means for applying control signals to an initial one of said stages, means for interconnecting the direct-current feedback paths within said bistable devices in a flip-flop arrangement, means for connecting the alternating-current feedback path of said bistable devices to selected other of said bistable devices in accordance with a code, at least one of said bistable devices having two separate alternating-current feedback paths individually connected to two other of said bistable devices, and a plurality of output conductors connected to a terminal one of said stages and adapted to be energized in a sequence determined by said code in response to the application of said control signals to said initial stage.

6. A transistor tree ring counter adapted to recycle after counting an odd number comprising a plurality of bistable devices having alternating-current and direct-current feedback paths, means for connecting said devices in serially related diverging stages, means for applying control pulses to an initial one of said stages, means connecting said direct-current feedback paths within said bistable devices to form flip-flop circuits, means connecting said alternating-current feedback paths of said bistable devices to selected other of said bistable devices in accordance with a code, a capacitor connected to said control pulsing means, first and second diodes connected in shunt, means for connecting said diodes to said capacitor, said first diode being connected to one of said bistable devices, said second diode being connected to a transistor switch, said capacitor being responsive to a pulse from said pulsing means when said transistor switch is conducting for applying a pulse to said initial stage, and a plurality of output conductors connected to a terminal one of said stages and adapted to be energized in a sequence determined by said code in response to the application of said control pulses to said initial stage.

7. A tree ring counter in accordance with claim 5 including in addition means connected to said control pulsing means and to one of said bistable devices for altering the location to which said control pulses are applied from said initial stage to said one bistable device during the cycle of operation.

8. A tree ring counter comprising a plurality of bistable devices operable to assume either of two states and having alternating-current and direct-current feedback paths, means for connecting said devices in serially related diverging stages including means for transferring said control signals by self-propagation from said initial stage to succeeding stages of said tree, means for applying control signals to an initial one of said stages, means including said device connecting means and responsive to the receipt of said control signals by said initial stage for selectively rendering said devices in a succeeding one of said stages operable and inoperable, means for connecting the alternating-current feedback paths of said bistable devices in said succeeding stage to selected other of said bistable devices in accordance with a code, means for individually connecting said direct-current feedback paths within each of said bistable devices, and a plurality of output conductors connected to a terminal one of said stages and adapted to be energized in a sequence determined by said code in response to the application of said control signals to said initial stage.

9. A transistor tree ring counter comprising a plurality of transistor flip-flops including two transistors having alternating-current and direct-current feedback paths, means for connecting said flip-flops in serially related first and second and third stages, means connecting said direct-current feedback paths in each of said flip-flops from the collector electrode of one transistor of said flip-flop to the base electrode of the other transistor of said flip-flop, said first stage including one flip-flop, said second stage including two flip-flops and said third stage including one flip-flop, a plurality of output conductors connected to the collector electrodes of said flip-flops in said second and third stages, said alternating-current feedback paths including a path from one of said flip-flops in said second stage to another of said flip-flops in said second stage and another path from said one flip-flop in said second stage to said flip-flop in said third stage, means for applying control signals to said first stage, and means for transferring the appliation of said control signals to said flip-flop in said third stage after a predetermined count.

10. A tree ring counter comprising a plurality of bistable devices operable to assume either of two states and having alternating-current and direct-current feedback paths, means for connecting said devices in serially related diverging stages and for selectively rendering operable and inoperable said devices connected in divergent ones of said stages, means for applying control signals to an initial one of said stages, coupling means for connecting the alternating-current feedback paths of said bistable devices in said divergent stages to selected other of said bistable devices in accordance with a code, means for interconnecting said direct-current feedback paths within said bistable devices, and a plurality of output conductors connected to a terminal one of said stages and adapted to be energized in a sequence determined by said coupling means, said coupling means being adapted responsive to the application of said control signal to said initial stage to select a path from said initial stage to said output conductor and to alter said selected path at each stage in response to the application of each control signal.

11. A transistor tree ring counter adapted to proceed from a particular output state to any other predetermined output state including a plurality of bistable devices having alternating-current and direct-current feedback paths, means for connecting said devices in serially related diverging stages, means for applying control signals to an initial one of said stages, means connecting the direct-current feedback paths within said bistable devices in a flip-flop configuration, means for connecting the alternating-current feedback paths of said bistable devices in said stages divergent from said initial stage to selected other of said bistable devices in accordance with a code, a plurality of output conductors connected to a terminal one of said stages and adapted to be energized in a sequence determined by said code in response to the application of said control signals to said initial stage, unilaterally conducting devices connected in shunt with said bistable devices, initiating signal means connected to said output conductors for applying a reference potential to said output conductors to forward bias said unilaterally conducting devices connected to said output conductor whereby said direct-current feedback paths drive the transistors determining a path through said tree and connected in shunt with said unilaterally conducting devices into the conducing condition thereby to establish a predetermined stable state representing a desired output condition in said tree, and means for applying additional control signals to said initial stage to recycle said tree counter in accordance with said code starting from said predetermined state.

12. A transistor tree ring counter in accordance with claim 11 wherein said unilaterally conducting devices are connected in shunt with only those of said bistable devices signifying the state to which the tree is to be forced.

13. A transistor tree variable length ring counter including a plurality of bistable devices having alternating-current and direct-current feedback paths, means for connecting said devices in serially related stages, means for applying control signals to an initial one of said stages, means connecting the alternating-current feedback paths of said bistable devices to selected other of said bistable devices in accordance with a code, means for connecting the direct-current feedback paths within said bistable devices in a flip-flop configuration, a plurality of output conductors connected to a terminal one of said stages and adapted to be energized in a sequence determined by said code in response to the application of said control signals to said initial stage, unilaterally conducting devices connected in shunt with those of said bistable devices which when operated determine an initial state of said counter, a selecting switch connected to each of said output conductors except a first output conductor representing the initial state of said counter, gating means connected to said switch, a pulsing source joining said gating means to said first conductor, means for setting said switch to connect to one of said output conductors whereby when the tree leaves the state represented by said one output conductor said pulsing source delivers an initiating signal to said first output conductor to forward bias said unilaterally conducting devices and force the tree to said initial state.

14. A transistor tree variable length ring counter in accordance with claim 13 wherein said pulsing source includes a monopulser.

15. A transistor tree variable length ring counter including a plurality of bistable devices having alternating-current and direct-current feedback paths, means for connecting said devices in serially related diverging stages, means for applying control signals to an initial one of said stages, means connecting the alternating-current feedback paths of said bistable devices to selected other of said bistable devices in accordance with a code, means for connecting the direct-current feedback paths within said bistable devices in a flip-flop configuration, a plurality of output conductors connected to a terminal one of said stages and adapted to be energized in a sequence determined by said code in response to the application of said control signals to said initial stage, unilaterally conducting devices connected in shunt with those of said bistable devices which when energized signify an initial state of said counter, a selecting switch connected to each of said output conductors except a first conductor representing the initial state of said counter, gating means connected to said switch, a pulsing source joining said gating means to said first output conductor, means for setting said switch to contact one of said output conductors whereby when the tree leaves the state represented by said output conductor said pulsing source delivers an initiating signal to said first output conductor to forward bias said unilaterally conducting devices and force the tree to the initial state, said means for applying control signals to said initial stage including a source of control pulses, a bistable circuit, a capacitor, first and second oppositely poled semiconductor diodes, means for connecting said diodes in shunt and means for connecting said diodes to said capacitor, means for connecting a first of said diodes to a source of reference potential, and means for connecting a second of said diodes to said initial stage, said capacitor being responsive during a pulse from said source of control pulses to store energy therein over a path including said first diode, said second diode being poled in a direction to prevent the passage of said control pulses therethrough and thereby to prevent a change of state of said initial stage, said capacitor being further responsive to the termination of said pulse to discharge into said initial stage over a path including said second diode thereby to change the state of said initial stage.

16. A transistor tree ring counter comprising a plurality of devices having feedback paths, means for connecting said devices in serially related diverging stages, means for applying control signals to an initial one of said stages, means connecting the feedback paths of said devices in a succeeding one of said stages to selected other of said devices in accordance with a code, a plurality of output conductors connected to a terminal one of said stages and adapted to be energized in a sequence determined by said code in response to the application of said control signals to said initial stage, unilaterally conducting means connected in shunt with each of said devices, and means for applying an initiating signal to a selected one of said output conductors to force a predetermined state in said tree, said unilaterally conducting means being responsive to said initiating signal to establish a conducting condition in the transistors which determine a path represented by said predetermined state.

17. A tree ring counter comprising a plurality of bistable devices having alternating-current and direct-current feedback paths, means for connecting said devices in serially related diverging stages, means for applying control signals to an initial one of said stages, coupling means for connecting the alternating-current feedback paths of said bistable devices to selected other bistable devices in accordance with a code, means for interconnecting said direct-current feedback paths within said bistable devices, and a plurality of output conductors connected to a terminal one of said stages and adapted to be energized in a sequence determined by said coupling means, said coupling means being adapted responsive to the application of said control signal to said initial stage to select a path from said initial stage to said output conductor and to alter said selected path at each stage in response to the application of each control signal, one of said bistable devices comprising a split alternating-current feedback path including a first feedback path from said one bistable device to another bistable device in the same stage and a second alternating-current feedback path from said one bistable device to a bistable device in a preceding stage.

18. A counter comprising a plurality of devices, each of said devices being capable when operated of assuming any one of a plurality of stable states; means for disposing said devices in a tree configuration having an initial stage and at least one succeeding divergent stage; output conductors associated with each of said devices, said conductors being equal in number to the plurality of states assumable by their associated device, and one of said conductors being energized when its associated device is operative in a corresponding one of its plurality of states; means including said output conductors of at least one of said stages for selectively rendering operable and inoperable said devices comprising the succeeding one of said stages; and means interconnecting the devices comprising each said divergent stage in accordance with a code, said rendering means being responsive to changes of state of devices comprising one of said stages for rendering inoperable at least one of said devices in a succeeding stage and for rendering operable at least one other of said latter devices, said interconnecting means being responsive to the rendering inoperable of said one device to operate said other device in a predetermined state.

19. The counter claimed in claim 18 wherein are provided two divergent stages.

20. The counter claimed in claim 18 wherein each said device has three stable states.

21. The counter claimed in claim 18 wherein one, and only one, of said output conductors associated with the said devices comprising any of said stages is energized at any one time.

22. The counter claimed in claim 18 wherein at least one of said divergent stages has an odd number of devices.

23. The counter claimed in claim 18 wherein each said device has two stable states.

24. The counter claimed in claim 23 wherein each of said devices in said at least one divergent stage comprises a transistor flip-flop, the feedback paths of said flip-flop having only resistive elements therein.

25. The counter claimed in claim 23 wherein the terminal one of said divergent stages comprises less than twice the number of said devices comprised by the said divergent stage immediately preceding said terminal stage.

26. The counter claimed in claim 23 wherein each of said devices comprises two transistors, and wherein only one transistor in each of said stages is conducting at any time.

References Cited in the file of this patent

UNITED STATES PATENTS

| | | |
|---|---|---|
| 2,557,086 | Fisk et al. | June 19, 1951 |
| 2,591,961 | Moore et al. | Apr. 8, 1952 |
| 2,808,535 | Lee | Oct. 1, 1957 |
| 2,846,594 | Pankratz et al. | Aug. 5, 1958 |
| 2,882,423 | MacSorley | Apr. 14, 1959 |
| 2,935,255 | Reiner | May 3, 1960 |